United States Patent [19]

Nakai

[11] Patent Number: 5,006,876
[45] Date of Patent: Apr. 9, 1991

[54] EXPOSURE CALCULATING DEVICE

[75] Inventor: Masaaki Nakai, Kawachinagano, Japan

[73] Assignee: Minolta Camera Kabushiki Kaisha, Osaka, Japan

[21] Appl. No.: 423,557

[22] Filed: Oct. 16, 1989

Related U.S. Application Data

[60] Continuation of Ser. No. 147,271, Jan. 22, 1988, abandoned, which is a division of Ser. No. 832,702, Feb. 25, 1986, Pat. No. 4,746,947.

[30] Foreign Application Priority Data

Feb. 25, 1985 [JP] Japan .................................. 60-36019
Mar. 19, 1985 [JP] Japan .................................. 60-55017

[51] Int. Cl.$^5$ .......................... G03B 7/08; G03B 13/36
[52] U.S. Cl. ....................................... 354/400; 354/410
[58] Field of Search ................. 354/400, 402, 410, 412

[56] References Cited

U.S. PATENT DOCUMENTS

| 4,514,073 | 4/1985 | Taniguchi et al. | 354/431 X |
| 4,690,536 | 9/1987 | Nakai et al. | 354/402 |
| 4,693,581 | 9/1987 | Yamaki et al. | 354/400 |
| 4,769,663 | 9/1988 | Yamaki et al. | 354/400 |

FOREIGN PATENT DOCUMENTS 148638 11/1978 Japan .
88416 6/1982 Japan .

Primary Examiner—W. B. Perkey
Attorney, Agent, or Firm—Burns, Doane, Swecker & Mathis

[57] ABSTRACT

An exposure calculating device including a device for automatically adjusting a focusing condition of an object of lens to produce an in-focus signal when the objective lens has been adjusted to its in-focus position, a device for producing a lock signal in response to a manual operation independent of a shutter-release operation, the lock signal being effective even if the in-focus signal has not been produced. The exposure calculating device further includes an apparatus for measuring brightness of an object field to produce brightness information corresponding to the measured brightness, a device for storing the brightness information, an apparatus for controlling the storing device to store the brightness information in response to the in-focus signal or the lock signal, and a device for interrupting the operation of the controlling device when the brightness information has been stored in response to the lock signal even if the in-focus signal is produced.

2 Claims, 10 Drawing Sheets

EXPOSURE CALCULATING DEVICE

This application is a continuation, of application Ser. No. 07/147,271, filed Jan. 22, 1988, now abandoned, which is a divisional of application Ser. No. 832,702 filed on Feb. 25, 1986, now U.S. Pat. No. 4,746,947.

BACKGROUND OF THE INVENTION

1. Field of the Invention

The invention relates to an exposure calculating device which is used for a camera having a function of locking the measured brightness information (referred to as AE lock hereinafter).

2. Description of the Prior Art

A conventional device for exposure calculation is disclosed in U.S. Pat. No. 4,412,730, where the field of view about to be photographed is divided into a plurality of areas, and then the luminance values on each divided areas are measured. The difference between the maximum luminance value and the minimum luminance value is obtained, or the luminance at the center of the field of view is compared with the maximum or minimum luminance value to judge the conditions of photography. The luminance values derived from the areas are used to perform exposure calculation according to the conditions.

A so-called AE (automatic exposure) lock technique has also been known. According to this technique, the range of measured brightness values is adjusted to a desired object. The data about the luminance obtained from the desired object is stored in a memory. After the range is altered, exposure calculation and control operation are performed, based on the stored data about the luminance.

When exposure is controlled using the calculation method discussed in the aforementioned U.S. Pat. No. 4,412,730, the probability that the filed of view to be photographed, especially the main subject, provides an appropriate exposure is undoubtedly much higher than the conventional case where exposure is controlled using the average luminance of the field of view. However, it is believed that the main subject is not yet sufficiently taken into account. For example, when such an exposure calculation is performed, if the maximum luminance obtained on the measured, divided areas is 9 or more in APEX system, the luminance of the main object is set equal or nearly equal to the minimum luminance. However, the main object does not always exist in the area giving the minimum or nearly minimum luminance.

When the aforementioned AE lock procedure is employed, the luminance of the object is stored in a memory and so an appropriate exposure is assured with respect to the object. Unfortunately, the other brightness or darker areas may yield under-exposure or over-exposure.

In known cameras, a flashlight control device for controlling the amount of flashlight used for flashlight photography is incorporated either in the body of an electronic flash device or in the body of a camera. In either case, the area subjected to brightness control covers substantially the whole field of view to be photographed or a relatively broad region including the center of the field of view.

In these flashlight control devices, the brightness control level at which emission of flashlight is stopped is determined based on the ratio of the amount of reflected light to the given amount of emitted flashlight. As an example, an object having a certain reflectivity (average reflectivity) is disposed opposite to a flash device so as to include the area subjected to brightness control. Then, a flashlight is emitted toward the object. The brightness control level is determined based on the amount of light reflected from the object such that the object provides a suitable exposure.

In general flashlight photography, the amount of light reflected from an object to be photographed varies. Hence, over-exposure or under-exposure may take place, depending on the setting of the brightness control level. More specifically, if objective lens is changed to one having different focal length is used or the object consists of a single or plural persons, i.e., if the object accounts for a different proportion, then the amount of light reflected from the subject and falling on the flashlight device will necessarily varies. This changes the amount of flashlight, which is determined by the amount of light incident on the flashlight device. As a natural consequence, exposure is not stable.

In order to solve these problems, a means may be contemplated in which the area used for control over luminance is narrowed into a spot, which is directed to the object to be photographed, for luminance control. If this means is carried out, the area for luminance control is always placed within the object, and the amount of reflected light is maintained constant. As a result, an appropriate exposure will be obtained. If the object lies outside the area for luminance control, however, the amount of flashlight is made inappropriate with respect to the object, leading to unsuitable exposure. As the area for luminance control is decreased, the probability of this undesired situation increases.

An object of the present invention is to provide an exposure calculating device capable of correctly measuring the brightness of the main object even if an in-focus condition is obtained after a manual AE lock.

SUMMARY OF THE INVENTION

In recent years, cameras having automatic focus-detecting device have gained wide acceptance. In general, a detection area for detecting the focusing condition of the objective lens is set at the center of the field of view of such a camera. The orientation of the camera is so determined that a portion of the main object is placed in the detection area.

The invention is applied to a camera having the aforementioned AE lock or focus-detecting function. When the AE lock is actuated or a focus-detecting device has detected the focusing condition, it is assumed that the main object exists at the center of the field of view with a high probability. The field of view is divided into a plurality of areas. The luminance value at the center of the field of view is stored in a memory and so on. Then, luminance values are obtained by, for example, the calculation method as disclosed in the aforementioned U.S. Pat. No. 4,412,730. The luminance values stored are used to recalculate the luminance values, in such a way that the whole field of view which the main object centers is made appropriate.

A construction for achieving this is shown in FIG. 1, and comprises a light measuring means 1, an instruction signal producing means 2, a storing means 3, a first calculating means 4, and a second calculating means 5. The field of view is divided into a plurality of areas. The luminance on each area is measured by the light measuring means 1 which produces output corresponding to the luminance. The instruction signal producing means 2 produces an instruction signal corresponding to the brightness at the center of the field of view and supplies the signal to the storing means 3 which stores the input data as a first luminance value. The output signal from the light measuring means 1 is applied to the first calculating means 4 that arithmetically finds the brightness on each area, which is hereinafter referred to as second luminance value. The output signal from the first calculating means 4 is fed to the second calculating means 5, which also receives the signal indicative of the first luminance value from the storing means 3. The second calculating means 5 calculates luminance values for exposure calculation, based on its two input signals.

When the instruction signal processing means 2 produces an instruction signal to the storing means 3, the storing means 3 stores the first luminance value corresponding to the brightness at the center of the field of view that is divided into the areas. At the same time, the first calculating means 4 receives the output signal from the light measuring means 1 and arithmetically finds second luminance values corresponding to the brightness on each area. Then, the signals indicating the first and second luminance values are applied to the second calculating means 5 to arithmetically process them, for obtaining luminance values used for exposure calculation.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DETAILED DESCRIPTION OF THE PREFERRED EMBODIMENTS

Figure 1:
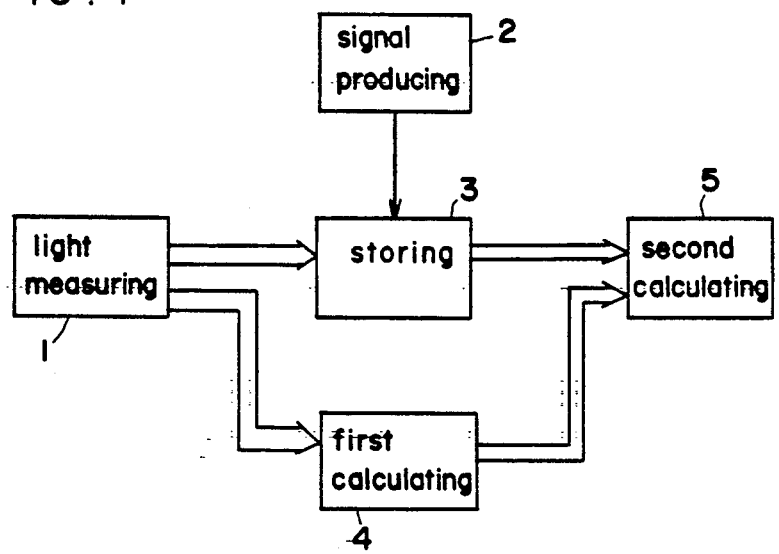
FIG. 1 is a block diagram of a device according to the present invention.
Figure 2:
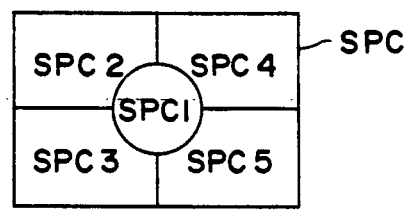
FIG. 2 shows a split pattern of light-receiving device used for embodiments of the invention.

Referring to FIG. 2, there is shown a division pattern formed by light-receiving device SPC and used for examples of the invention. The field of view to be photographed is divided into five areas SPC1-SPC5. A focus detection area for detecting the focus is included in the area SPC1.

Figure 3:
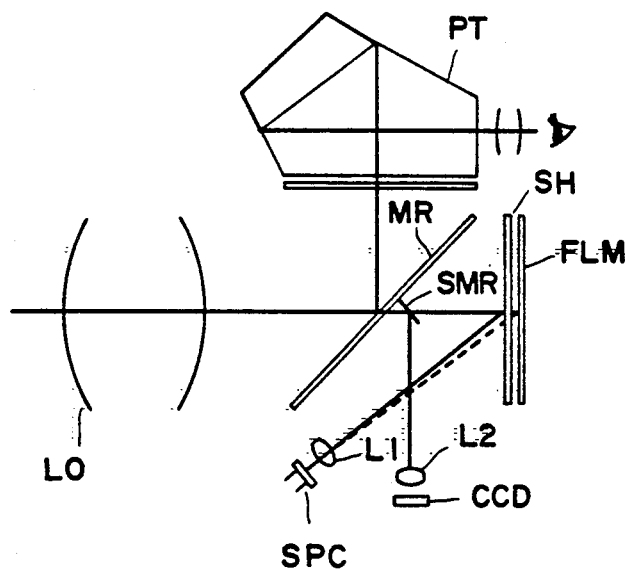
FIG. 3 is a schematic diagram of optical system for focus detection and for luminance measurement made by a camera.

FIG. 3 shows optical system for focus detection and measurement of luminance made by examples of the invention.

The optical system for focus detection is first described. Light is permitted to pass through an objective lens $L_0$, and is then partially transmitted through a main mirror MR entirely consisting of a half mirror. A portion of the light transmitted therethrough is reflected on a sub-mirror SMR and brought into focus on charge-coupled device CCD by a lens L2.

The optical system for measurement of luminance is now described. Light is permitted to pass through the taking lens $L_0$, and then it is transmitted through the main mirror MR. Thereafter, it is brought into focus on a shutter curtain SH having a diffusion surface on its surface. This diffusion surface is so processed that its reflectivity is substantially equal to that of a film surface FLM. The image formed on the shutter curtain SH is again brought into focus on the light-receiving device SPC by a lens L1. Luminance is measured for each individual area shown in FIG. 2. After the shutter is released, the main mirror MR and the sub-mirror SMR are moved away from the optical axis, and the image to be photographed is brought into focus on the film surface FLM. Since this image on the film surface FLM is again brought into focus on the light-receiving devices SPC, it is possible to monitor the light reflected from the object for each individual area shown in FIG. 2.

Figure 4:
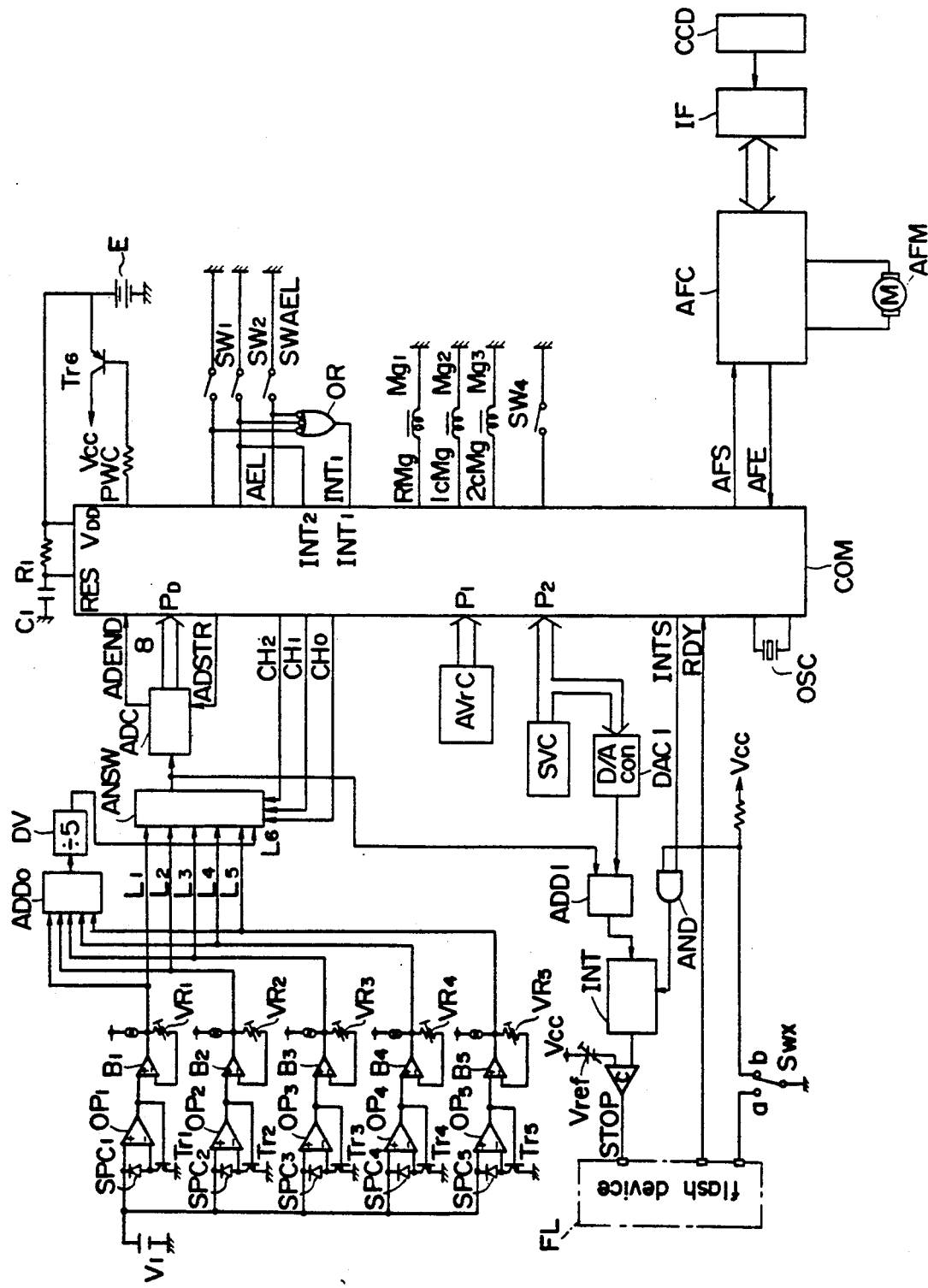
FIG. 4 is a diagram of an electric circuit constituting a first embodiment of the present invention.

Referring next to FIG. 4, there is shown an electric circuit of a first embodiment according to the invention. This circuit includes a microcomputer COM that acts to control operations performed by the whole camera system in a sequential manner and to perform calculating operations. A voltage source V1 supplies a bias voltage to the light-receiving devices. Operational amplifiers OP1-OP5 are connected to the light-receiving elements SPC1-SPC5, respectively, which measure the luminance values on the areas shown in FIG. 2. Transistors Tr1-Tr5 convert voltages that a logarithmic function of the output currents of the light-receiving elements SPC1-SPC5 into corresponding logarithmic compressed voltages, respectively. Buffers B1-B5 are used for impedance conversion. Variable resistors VR1-VR5 are employed to accommodate the characteristic variations among the elements. An adder circuit $ADD_0$ sums up the output signals from the buffers B1-B5. A division circuit DV produces an output that is equal to the adder circuit output divided by a numeral. An analog switch ANSW permits either one of the outputs from the buffers B1 to B5 to be delivered, according to the signal from the microcomputer COM. An analog-to-digital converter ADC converts the analog signal from the switch ANSW into digital form of eight bits. A power supply is indicated by E. A combination of a resistor R1 and a capacitor C1 can reset the microcomputer COM. All the circuit other than the microcomputer is energized through a transistor Tr6. When a shutter release button is depressed to a first position, a photography preparation switch $SW_1$ is turned on and initiates measurement of luminance as well as detection of the focus. When the release button is depressed further to a second position, a release switch $SW_2$ is actuated to start an operation for driving the shutter. The data about the luminance at the center $(SPC_1)$ of the field of view divided as shown in FIG. 2 is caused to be stored in the microcomputer in response to operation of an AE lock switch $SW_{AEL}$. A magnet $Mg_1$ is used to start the shutter release operation. Magnets $Mg_2$ and $Mg_3$ lock respectively first and second curtain of the shutter, respectively. A timing switch $SW_4$ is turned off when the film has been wound by one frame and turned on when the second curtain of the shutter completes its travel. Indicated by OSC is an oscillator. An aperture value-setting circuit AVrC produces an output signal in digital form of eight bits indicating the difference ($AV_{SET}-AV_0$) between the set aperture value $AV_{SET}$ and the aperture value $AV_0$ obtained when an aperture diaphragm of the lens is fully opened. The difference is expressed in terms of the number of aperture stop down steps. A film sensitivity-setting circuit SVC converts the set film sensitivity into digital form of eight bits, which is supplied to the microcomputer COM.

The circuitry shown in FIG. 4 further has a circuit for producing a flash halt signal to an electronic flash device FL. This circuit comprises a digital-to-analog converter $DAC_1$ for converting the digital signal from the film sensitivity-setting circuit SVC into analog form, an adder circuit $ADD_1$ for producing an output that is the sum of the output signal from the analog switch ANSW and the analog output from the converter $DAC_1$, an integrator circuit INT for integrating the output signal from the adder circuit $ADD_1$, and a comparator circuit C for comparing the output voltage from the integrator circuit INT with a reference voltage $V_{ref}$. A synchronous switch SWX for initiating a flashlight emission is usually connected to a terminal b. When the first curtain of the shutter completes its movement, it is switched to a terminal a. When movement of the second curtain of the shutter is started, it is switched back to the terminal b.

The circuitry shown in FIG. 4 is equipped with an automatic focus-detecting device that comprises charge-coupled devices CCD for collecting information about the brightness of the object, an interface circuit IF for converting the output signals from the charge-coupled devices CCD into other desired form, and a focus calculating circuit AFC which arithmetically processes the data about the object and controls an electric motor M to drive the objective lens.

Figure 7:
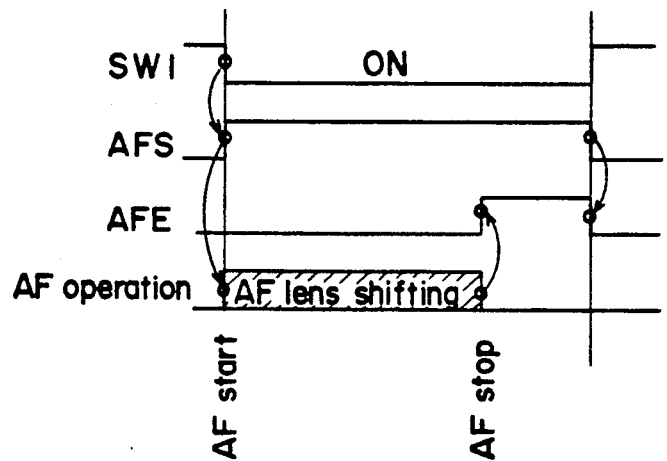
FIG. 7 is a time chart for illustrating the operation of an automatic focus detection device used for the first embodiment.

The operation of the automatic focus detection device is now described by referring to the time-chart of FIG. 7. When the photography preparation switch $SW_1$ is turned on, the microcomputer COM delivers focus detection start signal AFS to the focus calculating circuit AFC to start an operation for detecting the focus condition of the objective lens. Then, the lens is driven by the motor M until an in-focus condition is detected. The motor M is then stopped, so that the lens is no longer driven. At the same time, the focus calculating circuit AFC delivers a focus detection end signal AFE to the microcomputer COM. After the in-focus condition is once detected, the focus detection is not again performed even when the framing is altered unless the photography preparation switch $SW_1$ is released.

The operation of the circuitry constructed as described above is next described by referring to the flow-charts of FIGS. 5(a), 5(b), 5(c), 6(a) and 6(b). When a battery is installed, the input signal applied to the reset terminal RES of the microcomputer COM varies from low level "0" to high level "1". Then, the oscillator OSC starts oscillating. The microcomputer COM carries out reset routine (RESET) shown in FIG. 5(a). In this routine, all the output signals appearing at output terminals RMg, 1CMg, 2CMg, PWC, AFS, ADSTR and INTS and flags FLG1 and FLG2 are reset (#1-#7, #10, #11). Interruption 2 (INT 2) is disabled (#8), while interruption 1 is enabled (#9). Under these conditions, a stop instruction stops the oscillation of the oscillator OSC. Also, the microcomputer COM itself ceases to operate (#12). In this state, almost no electric current is consumed.

Then, when the photography preparation switch $SW_1$, the release switch $SW_2$, or the AE lock switch $SW_{AEL}$ is turned on, a signal applied from an OR circuit OR to an input terminal $INT_1$ of the microcomputer COM changes from "0" level to "1" level. Then, the microcomputer COM carries out the routine for interruption 1 (INT 1) in the manner as described below, the routine being shown in FIG. 5(b).

First, the signal level at an output terminal PWC of the microcomputer COM is turned to "0". This drives the transistor Tr6 on, energizing all the sections (#14). Subsequently, flag 1 (FLG 1), flag 2 (FLG 2), AE lock flag (AELF), and AE calculation end flag (AEEF) are reset (#15-#18). Then, interruption to the interruption 1 is disabled (#19). A check is performed to ascertain whether the photography preparation switch $SW_1$ has been turned on (#20). If so, the focus detection start signal (AFS) is increased to "1" level to start an operation for detecting the focusing condition (#22). If it is not so, the focus detection start signal (AFS) is reduced to "0" level (#21). As such, during operation for detection of the focusing condition, if the switch $SW_1$ is turned off, the operation is halted.

Figure 6A:
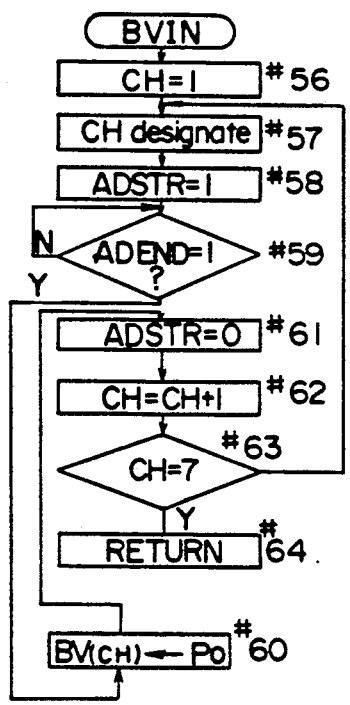
FIGS. 6(a)-6(c) are flowcharts for illustrating sequences of operations performed by the first embodiment.

Then, the flow proceeds to a subroutine (BVIN) (see FIG. 6(a)) for receiving signals indicating luminance values (#23). In this subroutine, the output signals from the light-receiving elements SPC1-SPC5 and their average value are converted into digital form, which is supplied to the microcomputer COM. More specifically, channels $CH_1$-$CH_3$ are designated as in Table 1 below. The analog switch ANSW delivers analog output indicating luminance value over lines L1-L6. Then, analog-to-digital conversion start signal ADSTR is increased to "1" level to initiate analog-to-digital conversion. After the completion of the conversion, analog-to-digital conversion end signal ADEND is brought to "1" level. These successive operations are repeated. The resultant digital signals are fed to registers BV1-BV6 of the microcomputer COM (#56-#64).

TABLE 1

| $CH_2$ | $CH_1$ | $CH_0$ | line | register |
| --- | --- | --- | --- | --- |
| 0 | 0 | 0 | $L_1$ | $BV_1$ |
| 0 | 0 | 1 | $L_2$ | $BV_2$ |
| 0 | 1 | 0 | $L_3$ | $BV_3$ |
| 0 | 1 | 1 | $L_4$ | $BV_4$ |
| 1 | 0 | 0 | $L_5$ | $BV_5$ |
| 1 | 0 | 1 | $L_6$ | $BV_6$ |

Then, the film sensitivity-setting circuit SVC applies digital signal indicating the film sensitivity to port P1 of the microcomputer COM. The aperture value-setting circuit AVrC supplies digital signal indicative of the aperture expressed in terms of the number of aperture stop down steps to port P2 of the microcomputer COM. They are furnished to registers SV and AVr, respectively, (see FIG. 5(b), #24 and #25). Subsequently, flags 1 and 2 (FLG1 and FLG2), are checked (#26, #27). When the in-focus condition is detected during automatic focus detection, or when the AE lock switch $SW_{AEL}$ is turned on, the luminance value at the center (SPC1) of the field of view is stored. If the condition flag 1 (FLG 1)=1 and flag 2 (FLG 2)=0 hold, the contents of the register BV1 are transferred to other register. The luminance value entered in this way is taken to be $BV_x$ (#28).

The flag 1 (FLG1) indicates whether the contents of the register holding the luminance value $BV_x$ are significant or not. The flag 2 (FLG2) is set to "1" after the luminance value $BV_x$ is entered into the register. Therefore, the luminance value $BV_x$ is entered into the register just when the flag 1 (FLG1) changes from "0" to "1" (#28, #29).

The following routines are used to calculate the shutter speed, or exposure time value TV. Depending on whether a main capacitor of the electronic flash device FL has been fully charged, or on whether the luminance value $BV_x$ is significant (FLG1=1) or not (FLG1=0), either one of the four routines is employed. The flash device FL produces a charge completion signal RDY to the microcomputer COM. This signal RDY assumes value "1" if the main capacitor has been fully charged and value "0" if it is not yet charged.

(1) RDY=0, FLG1=0

The photograph is taken under natural light. Exposure calculation is performed under the condition that the luminance value $BV_x$ is not yet entered into the register.

As known in the prior art techniques, excessively highlight portions and shadow portions are removed, based on the luminance values on the divided areas. Then, a luminance value $BV_0$ that provides a high probability of appropriate exposure is computed, based on the average value of the luminance of the remaining portions (#30–#32). It is also possible to calculate the luminance value by the calculation method as disclosed in the aforementioned U.S. Pat. No. 4,412,730.

(2) RDY=0, FLG1=1

The photograph is taken under natural light. Exposure calculation is performed under the condition that the luminance value $BV_x$ is entered into the register when the AE lock is established or the in-focus condition is detected.

Information about the luminance value $BV_x$ is available, in addition to the information obtained as described in (1) above. A new luminance value $BV_0$ that is more approximate to the stored luminance value $BV_x$ is calculated, based on the luminance value calculated in (1). As a result, appropriate exposure can be derived in which the surroundings are taken into account as well as the object (#30, #31, #34).

Figure 6C:
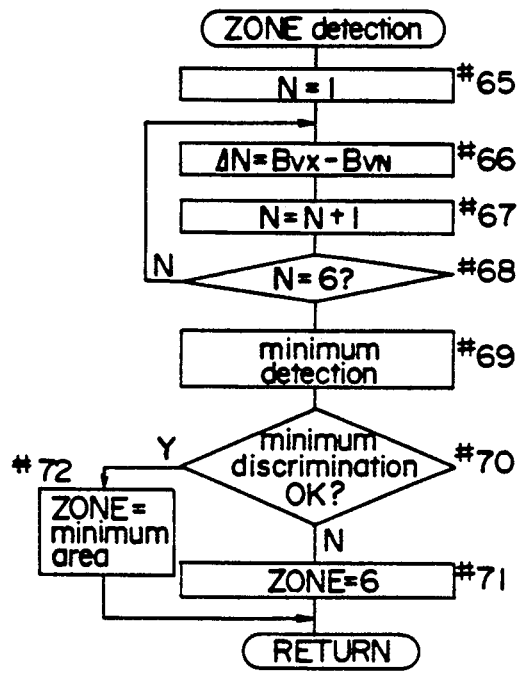
Figure 6B:
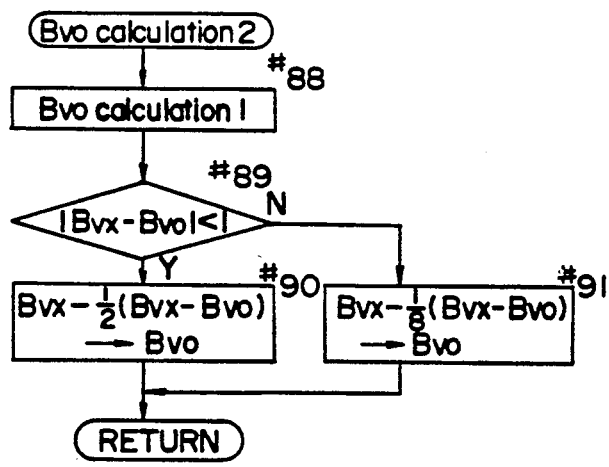

This is further described by referring to the subroutine $BV_0$ calculation 2 shown in FIG. 6(b) for exposure calculation. First, the luminance value $BV_0$ is computed while not considering the luminance value $BV_x$, in the same manner as in (1) (#88). The computed value is compared with the luminance value $BV_x$ (#89). Then, a certain proportion of the resulting difference is used to recalculate the luminance value $BV_x$.

More specifically, the certain proportion is set such that $$\text{when } |BV_x - BV_0| < 1, \tag{a}$$

the proportion is set equal to the half the difference (#90), $$\text{when } |BV_x - BV_0| > 1, \tag{b}$$

the proportion is equal to one-eighth the difference (#91).

Then, the luminance value is determined, based on the luminance of the main object. A further means may be contemplated in which the luminance values $BV_x$ are recalculated by introducing a certain amount corresponding to the difference.

As a further calculation method, either a certain proportion of the difference or a certain amount corresponding to the difference may be feedbacked to the luminance value $BV_0$. That is, in step #91, $BV_0 - \frac{1}{8}(BV_0 - BV_x)$ is set equal to $BV_0$ (#91'). In step #91, $BV_0 - \frac{1}{8}(BV_6 - BV_x)$ is set equal to $BV_0$ (#90'). The luminance value $BV_0$ obtained in step #88 is added to the luminance value derived from the main object. Then, a luminance value closer to the luminance of the object may be found by taking the luminance distribution over the whole field of view into account.

Then, a check is performed to discriminate whether the AE lock switch $SW_{AEL}$ has been turned on (#35). This operation is done to ascertain whether the calculation in step #34 above is performed because the AE lock has been established or because the in-focus condition has been detected. More specifically, where the in-focus condition has been detected (AELF=0), a new luminance value $BV_0$ is calculated, based on the luminance value $BV_x$ at the center and also on the luminance value $BV_0$ calculated from the values of the whole field of view (step #88). The luminance value $BV_x$ is obtained under the in-focus condition each time the flow enters this routine. The shutter speed is calculated from the new luminance value $BV_0$ (step #33). For example, if the framing is altered after the in-focus condition has been detected, a new luminance value is calculated from the luminance values $BV_0$ and $BV_x$ (step #88). The luminance value $BV_0$ is calculated from the values obtained from the whole field of view after the framing. The luminance value $BV_x$ is derived from the center of the field.

Figure 5:
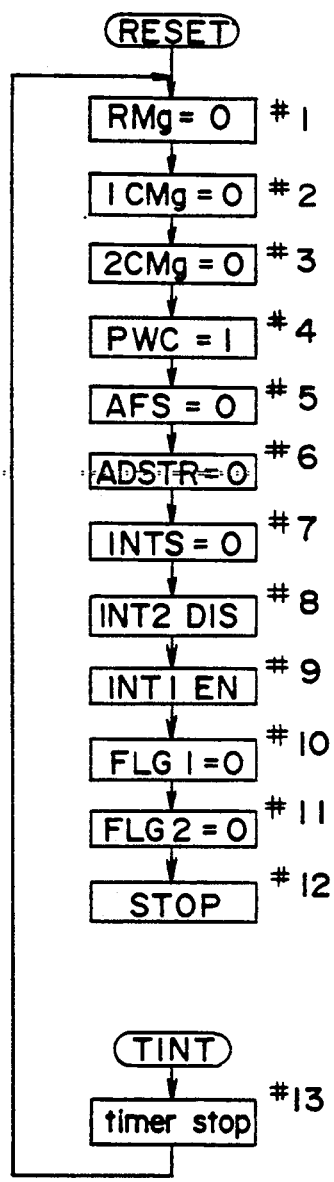
FIGS. 5(a) to 5(b) are flowcharts for illustrating a sequence of operations performed by the first embodiment.
Figure 5B:
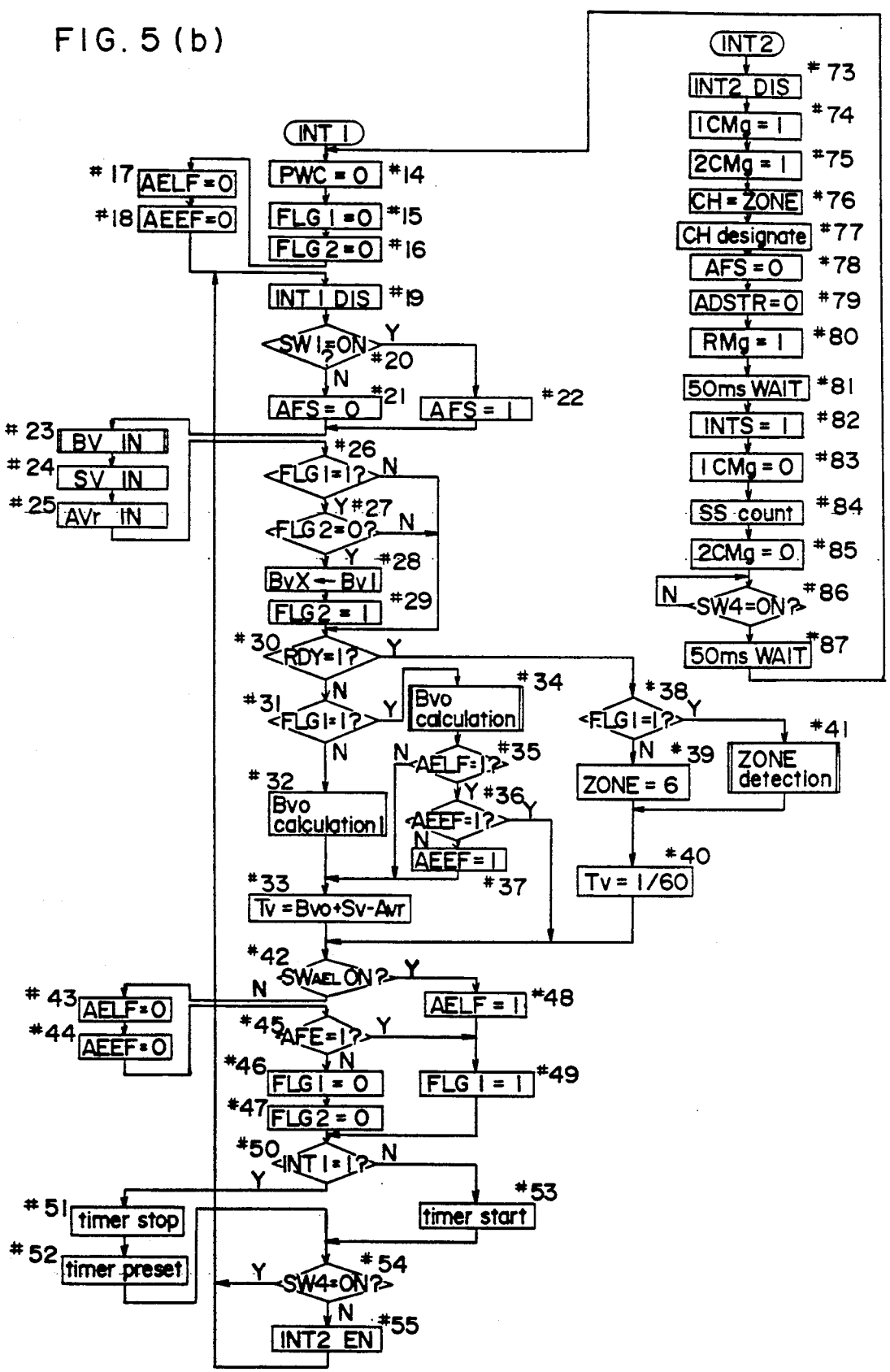

When the AE lock is established (AELF=1), a new luminance value $BV_0$ is calculated from the luminance values $BV_x$ and $BV_0$. The value $BV_x$ is obtained from the center of the field when the AE lock is established. The value $BV_0$ is computed from the values of the whole field of view. The shutter speed is calculated, based on the new value $BV_0$ (step #33). That is, when the AE lock switch $SW_{AEL}$ is closed, even if the framing is performed, the luminance value used for exposure calculation and the shutter speed do not vary. This is carried out as shown in FIG. 5(b). First, a check is performed to see if the AE lock flag (AELF) is at level 0 or 1 (#35). If it is at level 0, the flow goes to step #33. If it is at level 1, a check is performed to ascertain whether the AE lock calculation end flag (AEEF) has been set. If the flag has not been set, it is set (#37). Then, the flow proceeds to step #33, and the shutter speed is calculated (#35–#37). If the flag has been set in #36, the flow goes to step #42 without calculating the shutter speed.

The remaining two routines are associated with flash photography. The shutter speed is determined solely by the synchronous shutter speed of 1/60 sec. In this case, luminance values measured by the light-receiving elements shown in FIG. 2 are compared with the stored luminance values $BV_x$. Then, a light-receiving element used for luminance control is selected. The ratio of the main object to the area whose brightness is controlled during flash photography with better exposure. For this purpose, the brightness-controlled area is narrowed to some extent while keeping the object in that area. More specifically, the field of view is divided into a plurality of areas corresponding to arbitrary positions on the object. Then, a measurement is made to ascertain which of the areas contains the object. The ascertained area which should be subjected to luminance control is designated. Finally, the control operation is performed.

Figure 8:
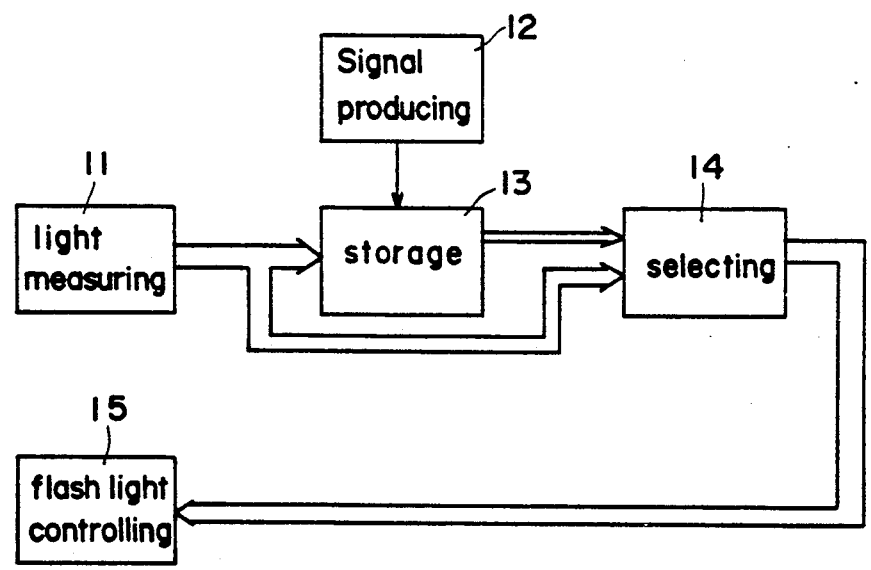
FIG. 8 is a block diagram showing the main structure for exposure calculation performed for flash photography in accordance with the first embodiment.

A construction for achieving this is shown in FIG. 8. This means comprises a light measuring means 11 for dividing the field of view to be photographed into a plurality of areas and measuring the luminance values on these areas, a flashlight control means 15 for dividing the field of view into a plurality of areas and controlling the brightness on each area with flashlight, an instruction signal-producing means 12 for producing an instruction signal that causes the output signal from the light measuring means 11 to be stored in a storage means 13, the output signal indicating the brightness at the center of the divided areas, and a selecting means 14 for determining the correlation between the stored output signal and the output signals indicating the luminance values on the areas and selecting the area to be subjected to brightness control from the areas.

When the instruction signal-producing means 12 delivers an instruction signal to the storage means 13, the storage means 13 stores the output signal indicating the brightness at the center of the divided areas among the signals produced from the light measuring means 11. The selecting means 14 receives the output signals indicative of the brightness at the center of the field of view, as well as the output signals derived from the divided areas. Then, it determines their correlation, detects the position of the main object, and instructs the brightness control means 15 which of the areas should be under brightness control of the control means 15 that is capable of controlling the brightness values on plural areas. The control means 15, of course, performs arithmetic operations for that purpose.

(3) RDY=1, FLG1=0

This is the case where the luminance value $BV_x$ obtained from the main object has not yet been accepted. That is, the position of the main object in the field of view is not yet known. Therefore, it is impossible to designate one of the areas shown in FIG. 2. Accordingly, the whole field of view (zone 6) is subjected to brightness control. When a release operation is performed, an analog output indicating the average brightness over the whole field of view is delivered to adder circuit $ADD_1$ along line $L_6$ (#30, #38-40 in FIG. 5(b).

(4) RDY=1, FLG1=1

This is the condition in which the luminance value $BV_x$ derived from the main object has been accepted. The flow proceeds from step #38 to step #41, where a subroutine (ZONE detection) for detecting the area to be subjected to brightness control is carried out (see FIG. 6(c)). In this subroutine, the position of the main object within the field of view is detected. Then, the area of the light-receiving device SPC shown in FIG. 2 is determined to subject only that area to brightness control.

First, the luminance values $BV_1$ to $BV_5$ about the areas and the stored luminance values $BV_x$ are subjected to subtraction operations, and the area showing the minimum deviation is detected (#65-69). This area is assumed to contain the main object. When a release operation is performed, the microcomputer COM designates this area and causes the analog switch ANSW to deliver an output to the adder ADD1 to control the brightness (#70, #72). If the minimum deviation takes too large value, or if some values approximate to it are obtained from other areas, then the detection operation might yield erroneous result. In this case, the whole field of view is subjected to brightness control, and when the release operation is performed, the output signal is made to indicate the average value in the same manner as in (3) above (#70, #71).

Referring back to step #42 shown in FIG. 5(b), the flow goes to a routine for setting flags. When the AE lock switch $SW_{AEL}$ is turned on, AE lock flag (AEFL) is set, and flag 1 FLG1 is set (#42, #48, #49). When the AE lock switch $SW_{AEL}$ is not turned on, the AE lock flag (AELF) and AE lock calculation end flag (AEEF) are reset (#42-#44). When the automatic focus detection device detects the in-focus condition and input signal AFE is in state "1", the microcomputer COM sets flag 1 (FLG1). Under the other condition, the flag 1 (FLG1) and flag 2 (FLG2) are reset (#45-#47, #49).

Thus, the controlling means and the interrupting means are implemented in the program which controls the microcomputer COM and respond to signals described above. The controlling means corresponds to the functions depicted in steps 16, 26, 27, 42, 45, 47, and 49 of the flow chart shown in FIG. 5(b). The interrupting means corresponds to the functions depicted in steps 29 and 42.

In summary, the function of the controlling means is to let the program proceed to step 29. The function of the interrupting means is to avoid step 47 in which the flag FLG2 would be reset to "0", which would cause the program to go from step 27 to step 28.

To explain the relevant portions of the flow chart shown in FIG. 5(b), flags FLG1 and FLG2 must be understood. The flag FLG1 indicates that either the in-focus signal or the lock signal has already been produced when the flag is set at "1". The flag FLG2 indicates that the brightness data has been already stored when this flag is set to "1".

Once the in-focus condition has been obtained, the line AFE is detected to be a high potential at step 45 of the flow charts shown in FIG. 5(b). Accordingly, the program proceeds from step 45 to step 49, where the flag FLG1 is set to "1". However, since the in-focus signal has just been produced, the flag FLG2 has not yet been set. The program proceeds to step 26 through steps 50-55 and 19-25. Since the flag FLG1 is set to "1" and the flag FLG2 is not set, the program proceeds to step 28 through step 27. At step 28, the brightness information is stored in register BVX which represents the storing means. The program then proceeds to step 29 where the flag FLG2 is set to "1".

The next time the program proceeds again to step 27 through steps 30-45, 39-55, and 19-26, the flag FLG2 will be detected to be set at step 27. Therefore, the program will proceed directly to step 30, so that the brightness information stored in the register BVX is not updated. Thus, it can be seen that the brightness information stored in the register BVX at the moment when the in-focus signal is produced is not further updated.

The flow path that occurs when the lock signal is produced prior to the achievement of the in-focus condition is as follows. At step 42 of the flow chart shown in FIG. 5(b), the AE lock switch SWAEL is detected to be closed (i.e. the lock signal is produced) prior to the production of the in-focus signal. The program then proceeds through step 48 to step 49 where the flag FLG1 is set to "1". However, since the AE lock switch SWAEL has just been closed, the flag FLG2 has not been set. The program proceeds to step 26 through steps 50–55 and 19–25. Since the flag FLG1 is set and the flag FLG2 is not set, the program proceeds to step 28 through step 27. At step 28, the brightness information is stored in a register BVX. The program then proceeds to step 29, where the flag FLG2 is set to "1".

The next time the program proceeds again to step 27 through steps 30–42, 48–55 and 19–26, the flag FLG2 will be set to a "1" value. Therefore, the program will proceed directly to step 30, so that the brightness information stored in the register BVX is not updated. Thus it can be seen that the brightness information stored in the register BVX at the moment when the lock signal is produced is not further updated.

Next, the flow path which occurs when the in-focus signal is produced after the brightness information has already been stored will be described. When the brightness information has already been stored in the storing means in response to the lock signal, flag FLG2 is set to a "1"-value. During the period when the manual AE lock is activated, the program proceeds from step 42 to step 50 through steps 48 and 49. So, even if the in-focus signal is produced, the program directly proceeds from step 27 to step 30, thereby skipping step 28. Accordingly, the brightness information which is obtained at the moment when the in-focus signal is produced after the production of a lock signal will not be stored in the storing means.

Thus, it can be seen that the operation of the controlling means is interrupted when the brightness information has been stored in response to the lock signal, even if an in-focus signal is produced.

Then, the flow proceeds to a routine for holding the power supply for a certain time. This routine is carried out to maintain measurement of luminance and display for a certain period even after the switch SW$_1$, the AE lock switch SW$_{AEL}$, and the release switch SW$_2$ are turned off. The "timer" used herein means a hardware timer incorporated in the microcomputer COM. When the timer is preset and a start instruction is given to it, the timer measures time independently of the flow. Upon completion of the measurement, the timer is interrupted (TINT).

When the signal appearing at terminal INT$_1$ of the microcomputer COM is in state "0", the timer is started (#50, #53). When it is in state "1", the timer is stopped, and then it is preset again (#50–#52). After a given period of time is measured, the timer is interrupted (TINT) to initiate the flow from the routine TINT. Then, the timer is stopped (#13), followed by the execution of reset routine (RESET). As a result, the camera is again brought to a stop condition (#12).

Then, a check is performed to ascertain whether timing switch SW$_4$ is turned on or not (#54). When the film has been completely wound by one frame up to the next position, i.e., when the timing switch SW$_4$ is open, interruption to the interruption routine INT$_2$ is allowed to permit release operation (#55).

The release operation is now described. When the film has been wound, if the release switch SW$_2$ is turned on, the interruption routine INT$_2$ is carried out. First, an interruption to this routine is disallowed (#73). Then, the magnets Mg$_2$ and Mg$_3$ for the first and second curtains, respectively, are energized (#74, #75). Subsequently, the analog switch ANSW is caused to designate a channel, according to the area specified by the step for specifying the area subjected to brightness control (#76, #77). Thereafter, the focus start signal AFS and A/D conversion start signal ADSTR are brought to "0" level, and then the magnet Mg$_1$ for starting release operation is energized (#78–#80). This raises mirror MR. It takes about 50 msec to stabilize, so that the system is on standby during this period (#81). Subsequently, intergration start signal INTS varies to "1" state to de-energize the magnet Mg$_2$ for starting the movement of the first curtain (#82, #83). Then, the first curtain is tripped to switch the synchronous switch SW$_x$ to the terminal a. At this time, if a switch for flashlight is closed, a flashlight is emitted. At the same time, an AND circuit AND goes to state "1", causing the integrator circuit INT to integrate the area specified by the subroutine for detection of the area undergoing brightness control, until a certain value is reached. Then, the comparator circuit C produces flashlight stop signal to the electronic flash device FL when the integrated value reaches a predetermined value, stopping the emission of the flashlight. After the time determined by the shutter speed elapses, the microcomputer COM de-energizes the magnet Mg$_3$ for the second curtain (#84, #85). The shutter speed is set by step #40 in the flashlight photography condition and by step #33 in natural light photography condition. The microcomputer COM waits until the timing switch SW$_4$ is closed or the lowering mirror becomes stable, whereupon the flow again goes through the loop for measuring luminance (#86, #87).

Figure 9:
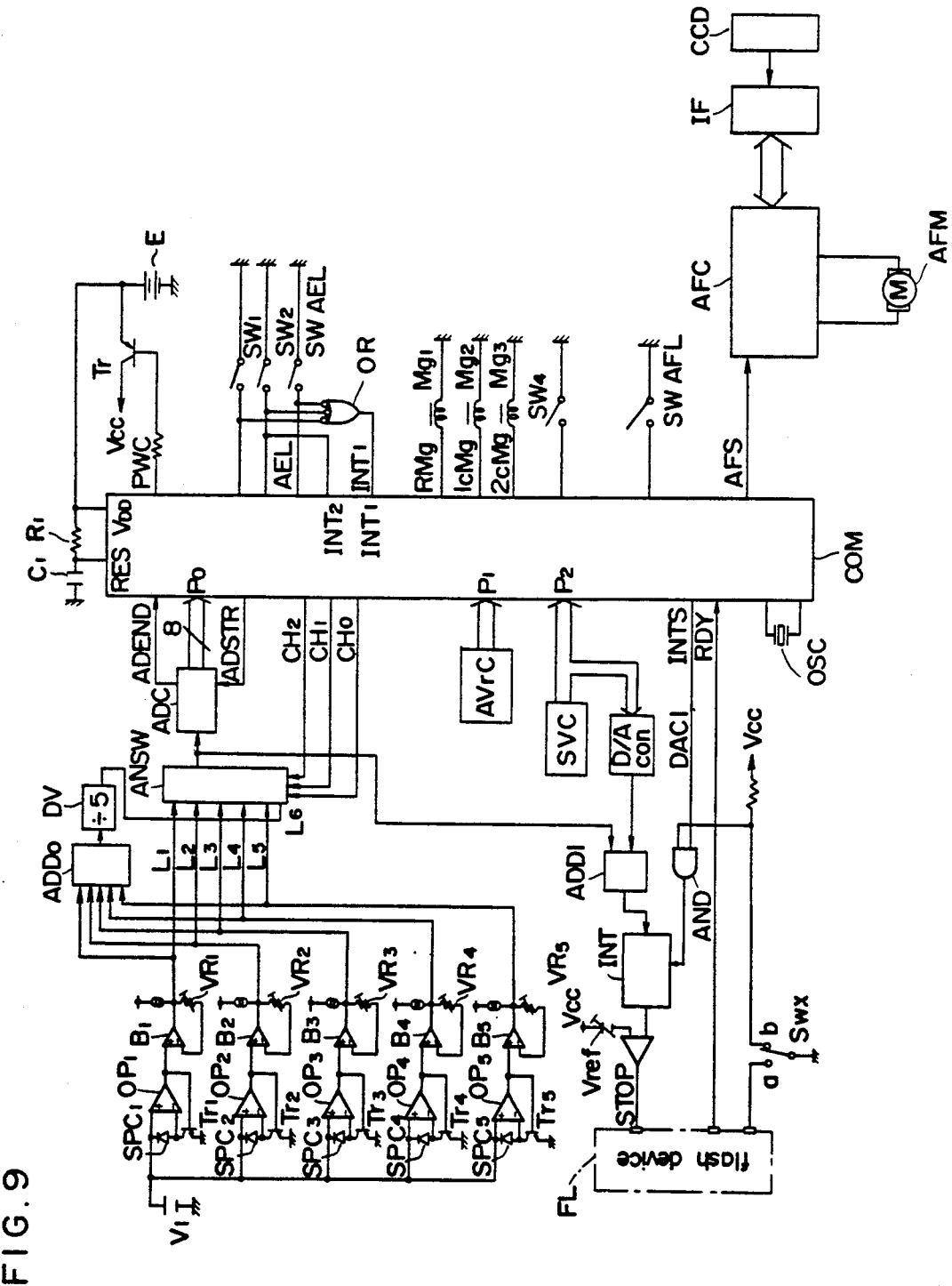
FIG. 9 is a diagram of an electric circuit constituting a second embodiment of the invention.
Figure 10A:
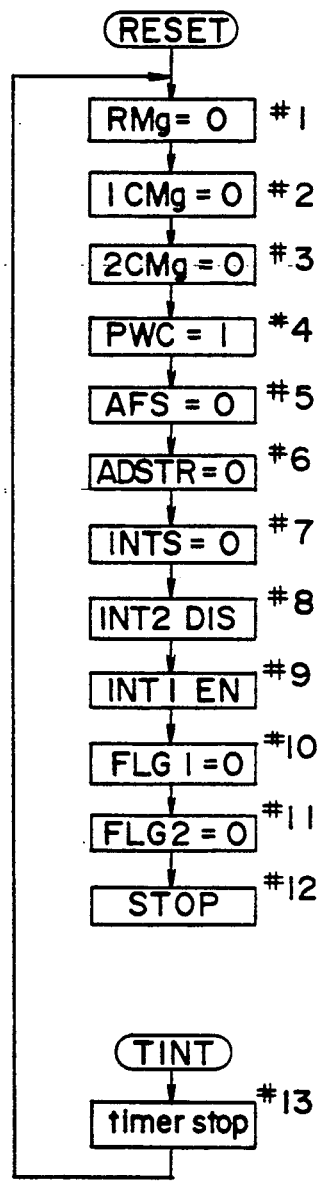
FIGS. 10(a) and 10(b) are flowcharts for illustrating a sequence of operations performed by the second embodiment.
Figure 10:
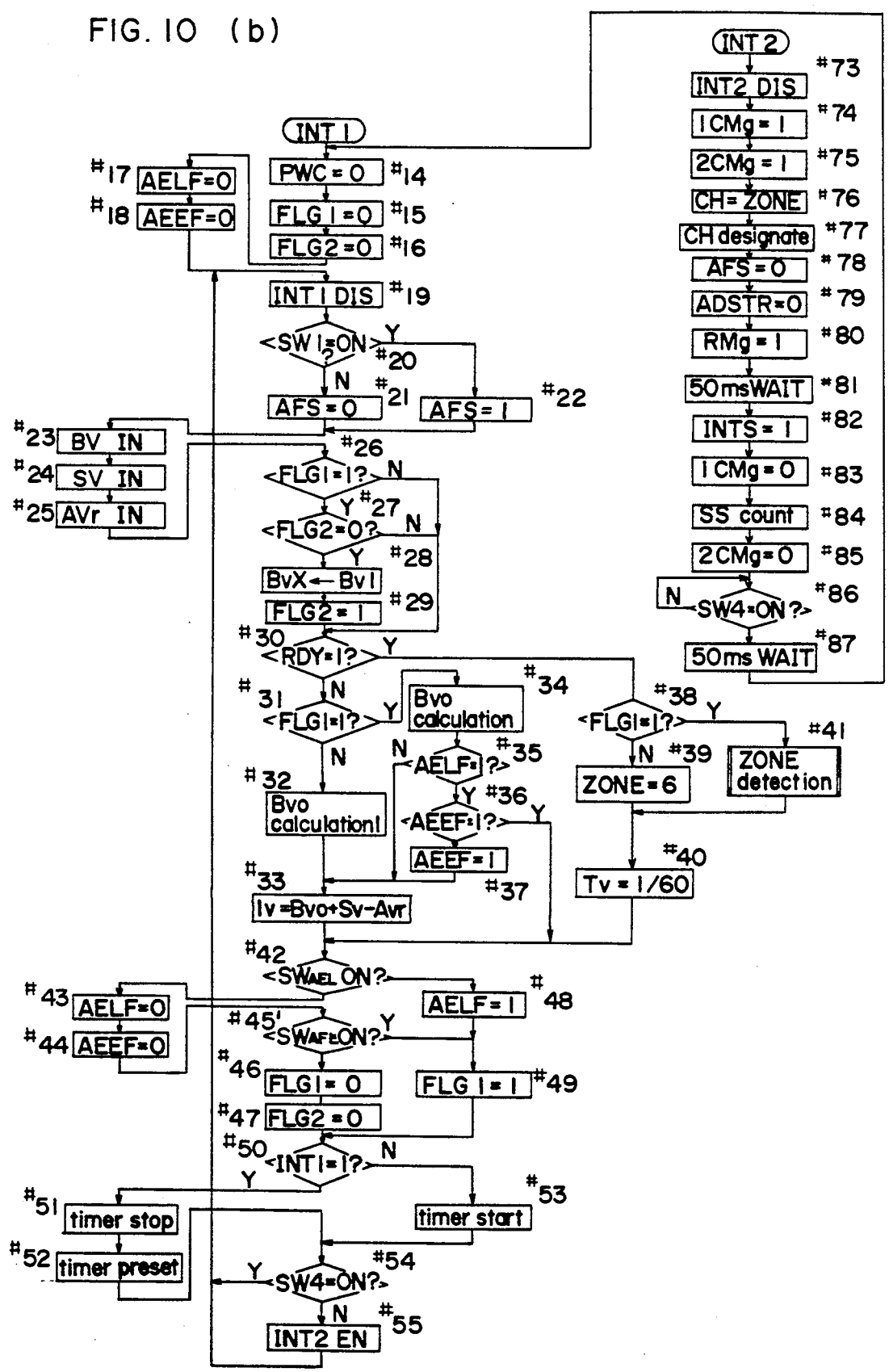
Figure 11:
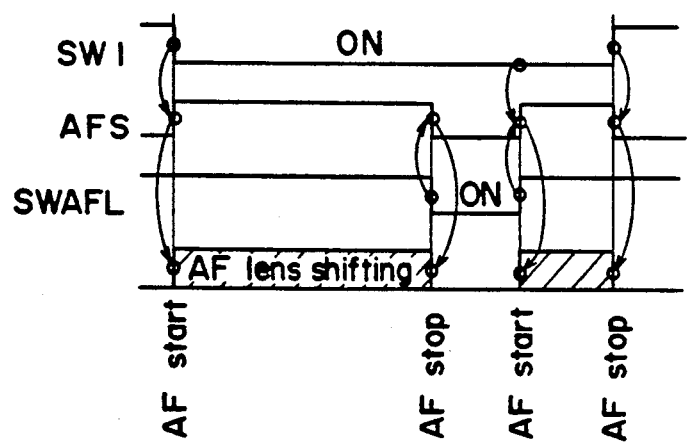
FIG. 11 is a time chart for illustrating the operation of an automatic focus detecting device used for the second embodiment.

Referring next to FIGS. 9, 10, 11, there is shown a second embodiment of the invention. The second embodiment is similar to the first embodiment except for the following structure. In the first embodiment, when the automatic focus detection device detects the once in-focus condition, the operation for the detection is halted, which is customarily called one-shot automatic focus detection. In the second embodiment, the focusing condition is always detected while the photography preparation switch SW$_1$ is closed. When it is desired to halt the operation for detecting the focusing condition, a newly provided AF lock switch SW$_{AFL}$ must be closed. This is known as continuous automatic focus detection. This operation is next described by referring to the time chart of FIG. 11. When the photography preparation switch SW$_1$ is closed, focus detection start signal AFS goes to state "1", initiating the detection of the focusing condition. Then, the lens L$_0$ is driven. When the AF lock switch SW$_{AFL}$ is closed, the focus detection start signal AFS goes to low level, terminating the detection. If the AF lock switch SW$_{AFL}$ is opened while the preparation switch SW$_1$ is maintained closed, the automatic focus detection device again starts to detect the focusing condition. When the preparation switch SW$_1$ is opened, the focus detection start signal AFS goes to 0 level, halting the detection.

A circuit configuration using this automatic focus-detecting device is shown in FIG. 9. The configuration shown in FIG. 9 has AF lock switch SW$_{AFL}$ for stopping the detection of the focusing condition, the switch not being used in the circuit shown in FIG. 4. Instead, the line for conducting the focus detection end signal from the focus-calculating circuit AFC is omitted.

The flow of control is now described by referring to the flowcharts of FIGS. 10(a) and 10(b). In the flowchart of FIGS. 5(a) and 5(b), a flag is controlled, depending on the state of the focus detection end signal. In the flowchart of FIG. 10(b), a flag is controlled, depending on the state of the AF lock switch SW$_{AFL}$. They are similar in other respects. That is, when the AF lock switch SW$_{AFL}$ is closed, the luminance value BV$_x$ is accepted.

It is to be noted that the invention is not limited to the foregoing embodiments. For example, the field of view may be divided into matrix-like arrangement, instead of the divided areas shown in FIG. 2. In this case, if the focus detecting area covers several areas, then these areas may be taken as the center of the field of view. Also in the above embodiments, the light-receiving device for receiving natural light also act as devices for controlling brightness in flashlight photography. They may be provided separately, in which case if the light-receiving devices for controlling brightness are divided into the same number of groups, then the cost will be increased. Accordingly, it will suffice to divide the field of view into a central portion and a substantially whole portion. In this case, only when the main object is found to exist in the central portion, the brightness in the center is controlled; otherwise the brightness in the whole portion is controlled.

As described above, in accordance with the invention, the field of view is divided into a plurality of areas, and brightness values on these areas are measured. Luminance values are calculated based on the output signals derived by the measurements. When AE lock is established, or when the focus detection device detects the in-focus condition, the luminance in the center of the field of view is found. This luminance indicating the main object is used to recalculate the luminance values, for exposure calculation. Consequently, the exposure can be controlled with greater emphasis on the main object than the prior art division measurement system.

Further, the invention provides the brightness control means for dividing the field of view into several areas and controlling the brightness. In addition, the area containing the main object, among the divided areas, is subjected to brightness control. Hence, the novel device can control the brightness with greater accuracy than the case where the conventional brightness control device is used, irrespective of either the position occupied by the subject within the field of view or its condition.

Although the present invention has been fully described with reference to the preferred embodiments, many modifications and variations thereof will now be apparent to those skilled in the art, and the scope of the present invention is therefore to be limited not by the details of the preferred embodiments described above, by only by the terms of the appended claims.

What is claimed is:

1. An exposure calculating device for use in a camera having a shutter, said shutter being adapted to be released in response to a shutter release operation, said exposure calculating device comprising:
   means for automatically adjusting a focusing condition of an objective lens to produce an in-focus signal when the objective lens has been adjusted to its in-focus position;
   means for producing a lock signal in response to a manual operation independent of the shutter-release operation, the lock signal being effective even if the in-focus signal has not been produced;
   means for measuring brightness of an object field to produce a brightness information corresponding to the measured brightness;
   means for storing the brightness information;
   means for controlling said storing means to store the brightness information in response to the in-focus signal or the lock signal; and
   means for interrupting the operation of said controlling means when the brightness information has been stored in response to the lock signal even if the in-focus signal is produced.

2. An exposure calculating device for use in a camera having a shutter, said shutter being adapted to be released in response to a shutter-release operation, said exposure calculating device comprising:
   means for automatically adjusting a focusing condition of an objective lens to produce an in-focus signal when the objective lens has been adjusted to its in-focus position;
   means for producing a lock signal in response to a manual operation independent of the shutter release operation;
   means for measuring brightness of an object field to produce a brightness information corresponding to the measured brightness;
   means for storing the brightness information;
   means for controlling said storing means to store the brightness information in response to one of the in-focus signal and the lock signal, which has been produced prior to the other; and
   means for interrupting the operation of said controlling means when the brightness information has been stored in response to the lock signal even if the in-focus signal is produced.

* * * * *